US009011711B2

(12) United States Patent
Rached

(10) Patent No.: US 9,011,711 B2
(45) Date of Patent: *Apr. 21, 2015

(54) HEAT TRANSFER FLUID REPLACING R-410A

(75) Inventor: Wissam Rached, Chaponost (FR)

(73) Assignee: Arkema France, Colombes (FR)

(*) Notice: Subject to any disclaimer, the term of this patent is extended or adjusted under 35 U.S.C. 154(b) by 32 days.

This patent is subject to a terminal disclaimer.

(21) Appl. No.: 13/391,417

(22) PCT Filed: Aug. 17, 2010

(86) PCT No.: PCT/FR2010/051727
§ 371 (c)(1),
(2), (4) Date: Mar. 8, 2012

(87) PCT Pub. No.: WO2011/030028
PCT Pub. Date: Mar. 17, 2011

(65) Prior Publication Data
US 2012/0161064 A1 Jun. 28, 2012

(30) Foreign Application Priority Data
Sep. 11, 2009 (FR) ...................... 09 56245

(51) Int. Cl.
*C09K 5/04* (2006.01)
*F25B 9/00* (2006.01)

(52) U.S. Cl.
CPC ........... *C09K 5/045* (2013.01); *C09K 2205/126* (2013.01); *C09K 2205/22* (2013.01); *F25B 9/006* (2013.01)

(58) Field of Classification Search
CPC ................. C09K 2205/122; C09K 2205/126; C09K 2205/22; C09K 5/045
USPC .......................................... 252/67
See application file for complete search history.

(56) References Cited

U.S. PATENT DOCUMENTS

| | | | |
|---|---|---|---|
| 8,070,977 B2 | 12/2011 | Rached | |
| 8,075,798 B2 | 12/2011 | Rached | |
| 8,246,850 B2 | 8/2012 | Rached | |
| 8,252,198 B2 | 8/2012 | Rached | |
| 8,557,135 B2 | 10/2013 | Rached | |
| 8,808,569 B2 | 8/2014 | Rached | |
| 8,858,825 B2 | 10/2014 | Guerin et al. | |
| 2006/0243944 A1 | 11/2006 | Minor et al. | |
| 2007/0007488 A1 | 1/2007 | Singh et al. | |
| 2008/0184731 A1* | 8/2008 | Sienel et al. | 62/467 |
| 2008/0314073 A1 | 12/2008 | Minor | |
| 2009/0253820 A1 | 10/2009 | Bowman et al. | |
| 2011/0084228 A1 | 4/2011 | Rached | |
| 2011/0095224 A1 | 4/2011 | Rached | |
| 2011/0186772 A1 | 8/2011 | Rached | |
| 2011/0219791 A1 | 9/2011 | Rached | |
| 2011/0219792 A1 | 9/2011 | Rached | |
| 2011/0240254 A1 | 10/2011 | Rached | |
| 2011/0284181 A1 | 11/2011 | Rached | |
| 2012/0049104 A1 | 3/2012 | Rached | |
| 2012/0056123 A1 | 3/2012 | Rached | |
| 2012/0068105 A1 | 3/2012 | Rached et al. | |
| 2012/0144857 A1 | 6/2012 | Rached | |
| 2012/0151958 A1 | 6/2012 | Rached | |
| 2012/0151959 A1 | 6/2012 | Rached | |
| 2012/0153213 A1 | 6/2012 | Rached | |
| 2012/0159982 A1 | 6/2012 | Rached | |
| 2012/0161064 A1 | 6/2012 | Rached | |
| 2012/0167615 A1 | 7/2012 | Rached | |
| 2012/0205574 A1 | 8/2012 | Rached et al. | |
| 2013/0105724 A1 | 5/2013 | Boussand | |
| 2013/0186114 A1 | 7/2013 | Guerin et al. | |
| 2014/0008565 A1 | 1/2014 | Rached et al. | |
| 2014/0075969 A1 | 3/2014 | Guerin et al. | |
| 2014/0318160 A1 | 10/2014 | Rached | |
| 2014/0326017 A1 | 11/2014 | Rached | |

FOREIGN PATENT DOCUMENTS

| | | |
|---|---|---|
| FR | 2 182 956 A3 | 12/1973 |
| FR | 2 256 381 A | 7/1975 |
| JP | 4110388 | 4/1992 |
| WO | WO 2004/037913 A2 | 5/2004 |
| WO | WO 2004/037913 A3 | 5/2004 |
| WO | WO 2005/105947 A2 | 11/2005 |
| WO | WO 2006/094303 A2 | 9/2006 |
| WO | WO 2008/009922 A2 | 1/2008 |

OTHER PUBLICATIONS

**Boussand, Béatrice, U.S. Appl. No. 14/371,118 entitled "Heat Transfer Compositions Having Improved Miscibility With Lubricating Oil," filed in the U.S. Patent and Trademark Office on Jul. 8, 2014.

* cited by examiner

*Primary Examiner* — John Hardee
(74) *Attorney, Agent, or Firm* — Buchanan Ingersoll & Rooney P.C.

(57) ABSTRACT

The invention relates to a heat transfer method using a ternary composition containing 2,3,3,3-tetrafluoropropene, 1,1-difluoroethane and difluoromethane, as a heat transfer fluid in refrigeration systems, to replace the R-410A mixture.

14 Claims, No Drawings

HEAT TRANSFER FLUID REPLACING R-410A

FIELD OF THE INVENTION

The present invention relates to the use of ternary compositions of 2,3,3,3-tetrafluoropropene as heat transfer fluids replacing R-410A.

BACKGROUND OF THE INVENTION

The problems posed by substances with ozone depletion potential (ODP) were discussed in Montreal, where the protocol was signed requiring a reduction of the production and use of chlorofluorocarbons (CFCs). Amendments have been made to this protocol, requiring abandonment of CFCs and extending the regulations to cover other products, including hydrochlorofluorocarbons (HCFCs).

The refrigeration and air conditioning industry has made a considerable investment in substitution of these refrigerants, and accordingly hydrofluorocarbons (HFCs) were put on the market.

The (hydro)chlorofluorocarbons used as expanding agents or solvents have also been replaced with HFCs.

In the automobile industry, the systems for air conditioning of vehicles marketed in many countries have changed over from a chlorofluorocarbon refrigerant (CFC-12) to a hydrofluorocarbon refrigerant (1,1,1,2-tetrafluoroethane: HFC-134a), which is less harmful to the ozone layer. However, with respect to the objectives established by the Kyoto protocol, HFC-134a (GWP=1300) is considered to have a high warming power. A fluid's contribution to the greenhouse effect is quantified by a criterion, GWP (Global Warming Potential), which summarizes the warming power by taking a reference value of 1 for carbon dioxide.

As carbon dioxide is nontoxic, nonflammable and has a very low GWP, it has been proposed as a refrigerant for air conditioning systems in place of HFC-134a. However, the use of carbon dioxide has several drawbacks, notably connected with the very high pressure for its application as refrigerant in existing equipment and technologies.

Moreover, the mixture R-410A consisting of 50 wt. % of pentafluoroethane and 50 wt. % of HFC-134a is widely used as refrigerant in stationary air conditioners. However, this mixture has a GWP of 2100.

Document JP 4110388 describes the use of hydrofluoropropenes of formula $C_3H_mF_n$, with m, n representing an integer between 1 and 5 inclusive and m+n=6, as heat transfer fluids, in particular tetrafluoropropene and trifluoropropene.

Document WO2004/037913 discloses the use of compositions comprising at least one fluoroalkene having three or four carbon atoms, notably pentafluoropropene and tetrafluoropropene, preferably having a GWP of at most 150, as heat transfer fluids.

Document WO 2005/105947 teaches the addition to tetrafluoropropene, preferably 1,3,3,3-tetrafluoropropene, of an expanding co-agent such as difluoromethane, pentafluoroethane, tetrafluoroethane, difluoroethane, heptafluoropropane, hexafluoropropane, pentafluoropropane, pentafluorobutane, water and carbon dioxide.

Document WO 2006/094303 discloses an azeotropic composition containing 7.4 wt. % of 2,3,3,3-tetrafluoropropene (1234yf) and 92.6 wt. % of difluoromethane (HFC-32). This document also discloses an azeotropic composition containing 91 wt. % of 2,3,3,3-tetrafluoropropene and 9 wt. % of difluoroethane (HFC-152a).

A heat exchanger is a device for transferring thermal energy from one fluid to another, without mixing them. The thermal flux passes through the exchange surface that separates the fluids. Mostly this method is used for cooling or heating a liquid or a gas that cannot be cooled or heated directly.

In compression systems, heat exchange between the refrigerant and the heat sources takes place via heat-transfer fluids. These heat transfer fluids are in the gaseous state (the air in air conditioning and direct-expansion refrigeration), liquid (water in domestic heat pumps, glycol solution) or two-phase.

There are various transfer modes:
- the two fluids are arranged in parallel and go in the same sense: co-current mode (antimethodical);
- the two fluids are arranged in parallel but go in the opposite sense: countercurrent mode (methodical);
- the two fluids are positioned perpendicularly: crossed-current mode. The crossed current can have co-current or countercurrent tendency;
- one of the two fluids makes a U-turn in a wider pipeline, which the second fluid passes through. This configuration is comparable to a co-current exchanger on half its length, and to a countercurrent exchanger for the other half: pin-head mode.

DETAILED DESCRIPTION OF THE INVENTION

The applicant has now discovered that ternary compositions of 2,3,3,3-tetrafluoropropene, 1,1-difluoroethane and difluoromethane are particularly advantageous as heat transfer fluid.

These compositions have both a zero ODP and a GWP below that of existing heat transfer fluids such as R-410A.

Moreover, their performance (COP: coefficient of performance, defined as the useful power delivered by the system to the power supplied to or consumed by the system) is greater than that of existing heat transfer fluids such as R-410A.

The compositions used as heat transfer fluid in the present invention have a critical temperature above 87° C. (the critical temperature of R-410A is 70.5° C.). These compositions can be used in heat pumps for supplying heat at temperatures up to 65° C. but also at higher temperatures up to 87° C. (temperature range where R-410A cannot be used).

The compositions used as heat transfer fluid in the present invention have temperatures at the compressor outlet equivalent to the values given by R-410A. The pressures at the condenser are lower than the pressures of R-410A and the compression ratios are also lower. These compositions can use the same compressor technology as used with R-410A.

The compositions used as heat transfer fluid in the present invention have saturated-vapor densities below the saturated-vapor density of R-410A. The volumetric capacities given by these compositions are equivalent to the volumetric capacity of R-410A (between 91 and 95%). Owing to these properties, these compositions operate with smaller pipeline diameters and therefore less head loss in the vapor pipelines, which increases the performance of the installations.

These compositions are suitable preferably in compression-type refrigeration systems with exchangers operating in countercurrent mode or in crossed-current mode with countercurrent tendency.

Thus, these compositions can be used as heat transfer fluid in heat pumps, optionally reversible, in air conditioning, and in low-temperature and medium-temperature refrigeration employing compression systems with exchangers in countercurrent mode or in crossed-current mode with countercurrent tendency. The present invention therefore relates to the use of ternary compositions of 2,3,3,3-tetrafluoropropene, 1,1-difluoroethane and difluoromethane as heat transfer fluid in refrigeration systems replacing the mixture R-410A.

Preferably, these compositions are used in compression-type refrigeration systems with exchangers operating in countercurrent mode or in crossed-current mode with countercurrent tendency.

Preferably, the compositions used in the present invention contain essentially from 5 to 83 wt. % of 2,3,3,3-tetrafluoropropene and from 2 to 50 wt. % of 1,1-difluoroethane and from 15 to 75 wt. % of difluoromethane.

Advantageously, the compositions used contain essentially from 5 to 63 wt. % of 2,3,3,3-tetrafluoropropene and from 2 to 25 wt. % of difluoroethane and from 35 to 70 wt. % of difluoromethane.

The compositions that are particularly preferred contain essentially from 40 to 58 wt. % of 2,3,3,3-tetrafluoropropene, from 40 to 50 wt. % of difluoromethane and from 2 to 10 wt. % of 1,1-difluoroethane.

The compositions used in the present invention can be stabilized. The stabilizer preferably represents at most 5 wt. % relative to the total composition.

As stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl optionally fluorinated or perfluorinated or alkenyl or aromatic) such as n-butyl glycidyl ether, hexanediol diglycidyl ether, allyl glycidyl ether, butylphenylglycidyl ether, phosphites, phosphates, phosphonates, thiols and lactones.

Another object of the present invention relates to a method of heat transfer in which the aforementioned ternary compositions of 2,3,3,3-tetrafluoropropene, 1,1-difluoroethane and difluoromethane are used as heat transfer fluid in refrigeration systems replacing the mixture R-410A.

Preferably, the method is employed in compression-type refrigeration systems with exchangers operating in countercurrent mode or in crossed-current mode with countercurrent tendency.

The method according to the present invention can be implemented in the presence of lubricants such as mineral oil, alkylbenzene, polyalkylene glycol and polyvinyl ether.

The compositions used in the present invention are suitable for replacing R-410A in refrigeration, air conditioning and heat pumps with the existing installations.

Experimental Section

Tools for Calculation

The RK-Soave equation is used for calculating the densities, enthalpies, entropies and the data on liquid-vapor equilibrium of the mixtures. To use this equation it is necessary to know the properties of the pure substances used in the mixtures in question as well as the coefficients of interaction for each binary mixture.

The data required for each pure substance are:

Boiling point, critical temperature and pressure, curve of pressure as a function of temperature from the boiling point to the critical point, the saturated liquid density and saturated vapor density as a function of temperature.

HFC-32, HFC-152a:

The data for these products are published in ASHRAE Handbook 2005 chapter 20, and are also available using Refrop (software developed by NIST for calculating the properties of refrigerants).

HFO-1234yf

The data for the temperature-pressure curve of HFO-1234yf are measured by the static method. The critical temperature and pressure are measured with a C80 calorimeter marketed by Setaram. The densities, at saturation as a function of temperature, are 1'5 measured by the vibrating tube densimeter technology developed by the laboratories of the Ecole de Mines ("Mining Engineering College") in Paris.

Coefficient of Interaction of the Binary Mixtures

The RK-Soave equation uses coefficients of binary interaction for representing the behavior of the products in mixtures. The coefficients are calculated as a function of experimental data for liquid-vapor equilibrium.

The technique used for the measurements of liquid-vapor equilibrium is the static analytical cell method. The equilibrium cell comprises a sapphire tube and is equipped with two ROLSI™ electromagnetic samplers. It is immersed in a cryo-thermostat bath (HUBER HS40). Magnetic stirring driven by a field rotating at variable speed is used for accelerating attainment of the equilibria. The samples are analyzed by gas chromatography (HP5890 series II) using a catharometer (TCD).

HFC-32/HFO-1234yf, HFC-152a/HFO-1234yf:

The measurements of liquid-vapor equilibrium on the HFC-32/HFO-1234yf binary mixture are performed for the following isotherms: −10° C., 30° C. and 70° C.

The measurements of liquid-vapor equilibrium on the HFC-152a/HFO-1234yf binary mixture are performed for the following isotherms: 10° C.

HFC-32/HFC-152a:

The data on liquid-vapor equilibrium for the HFC-152a/HFC-32 binary mixture are available using Refprop. Two isotherms (−20° C. and 20° C.) and two isobars (1 bar and 25 bar) are used for calculating the coefficients of interaction for this binary.

Compression System

Consider a compression system equipped with an evaporator and countercurrent condenser, a screw compressor and a pressure reducing valve.

The system operates with 15° C. of superheating and 5° C. of supercooling. The minimum temperature difference between the secondary fluid and the refrigerant is considered to be of the order of 5° C.

The isentropic efficiency of the compressors is a function of the compression ratio. This efficiency is calculated from the following equation:

$$\eta_{isen} = a - b(\tau - c)^2 - \frac{d}{\tau - e} \tag{1}$$

For a screw compressor, the constants a, b, c, d and e in equation (1) of isentropic efficiency are calculated using standard data published in the handbook "Handbook of air conditioning and refrigeration", page 11.52.

% CAP is the percentage of the ratio of the volumetric capacity supplied by each product to the capacity of R-410A.

The coefficient of performance (COP) is defined as the ratio of the useful power delivered by the system to the power supplied to or consumed by the system.

The Lorenz coefficient of performance (COPLorenz) is a reference coefficient of performance. It is a function of temperature and is used for comparing the COPs of different fluids.

The Lorenz coefficient of performance is defined as follows: (The temperatures T are in K)

$$T_{mean}^{condenser} = T_{inlet}^{condenser} - T_{outlet}^{condenser} \quad (2)$$

$$T_{mean}^{evaporator} = T_{outlet}^{evaporator} - T_{inlet}^{evaporator} \quad (3)$$

The Lorenz COP in the case of air conditioning and refrigeration is:

$$COPlorenz = \frac{T_{mean}^{evaporator}}{T_{mean}^{condenser} - T_{mean}^{evaporator}} \quad (4)$$

The Lorenz COP in the case of heating is:

$$COPlorenz = \frac{T_{mean}^{condenser}}{T_{mean}^{condenser} - T_{mean}^{evaporator}} \quad (5)$$

For each composition, the coefficient of performance of the Lorenz cycle is calculated as a function of the corresponding temperatures.

% COP/COPLorenz is the ratio of the COP of the system relative to the COP of the corresponding Lorenz cycle.

Results, Cooling Mode or Air Conditioning

In cooling mode, the compression system operates between a refrigerant inlet temperature at the evaporator of −5° C. and a refrigerant inlet temperature at the condenser of 50° C. The system delivers cold at 0° C.

The performance of the compositions according to the invention in cooling operating conditions is given in Table 1. The values of the constituents (HFO-1234yf, HFC-32, HFC-152a) for each composition are given as percentage by weight.

TABLE 1

| HFO-1234yf | HFC-32 | HFC-152a | Temp outlet evap (° C.) | Temp outlet comp (° C.) | T outlet cond (° C.) | evap P (bar) | cond P (bar) | Ratio (w/w) | Shift | efficiency comp | % CAP | % COP/ COPLorenz |
|---|---|---|---|---|---|---|---|---|---|---|---|---|
| R410A | | | −5 | 101 | 50 | 6.8 | 30.6 | 4.5 | 0.07 | 79.6 | 100 | 50.4 |
| 50 | 45 | 5 | −1 | 95 | 45 | 5.6 | 23.3 | 4.2 | 4.00 | 80.5 | 92 | 55.9 |
| 45 | 50 | 5 | −2 | 99 | 46 | 5.7 | 24.4 | 4.2 | 3.48 | 80.3 | 95 | 55.4 |
| 45 | 45 | 10 | −1 | 97 | 45 | 5.4 | 22.8 | 4.2 | 4.26 | 80.4 | 92 | 56.5 |
| 40 | 50 | 10 | −1 | 100 | 46 | 5.6 | 23.9 | 4.3 | 3.87 | 80.2 | 95 | 56.1 |

Results, Heating Mode

In heating mode, the compression system operates between a refrigerant inlet temperature at the evaporator of −5° C. and a refrigerant inlet temperature at the condenser of 50° C. The system delivers heat at 45° C.

The performance of the compositions according to the invention in operating conditions in heating mode is given in Table 2. The values of the constituents (HFO-1234yf, HFC-32, HFC-152a) for each composition are given as percentage by weight.

TABLE 2

| HFO-1234yf | HFC-32 | HFC-152a | Temp outlet evap (° C.) | Temp outlet comp (° C.) | T outlet cond (° C.) | evap P (bar) | cond P (bar) | Ratio (w/w) | Shift | efficiency comp | % CAP | % COP/ COPLorenz |
|---|---|---|---|---|---|---|---|---|---|---|---|---|
| R410A | | | −5 | 101 | 50 | 6.8 | 30.6 | 4.5 | 0.07 | 79.6 | 100 | 58.8 |
| 45 | 50 | 5 | −2 | 99 | 46 | 5.7 | 24.4 | 4.2 | 3.48 | 80.3 | 92 | 63.1 |
| 40 | 50 | 10 | −1 | 100 | 46 | 5.6 | 23.9 | 4.3 | 3.87 | 80.2 | 91 | 63.6 |

Results, Low-Temperature Refrigeration

In low-temperature refrigeration mode, the compression system operates between a refrigerant inlet temperature at the evaporator of −30° C. and a refrigerant inlet temperature at the condenser of 40° C. The system delivers cold at −25° C.

The performance of the compositions according to the invention in operating conditions in refrigeration mode is given in Table 3. The values of the constituents (HFO-1234yf, HFC-32, HFC-152a) for each composition are given as percentage by weight.

TABLE 3

| | R410A | | | | | | | | | | | |
|---|---|---|---|---|---|---|---|---|---|---|---|---|
| HFO-1234yf | HFC-32 | HFC-152a | Temp outlet evap (° C.) | Temp outlet comp (° C.) | T outlet cond (° C.) | evap P (bar) | cond P (bar) | Ratio (w/w) | Shift | efficiency comp | % CAP | % COP/COPLorenz |
| | | | −30 | 149 | 40 | 2.7 | 24.2 | 9.0 | 0.06 | 52.3 | 100 | 33.0 |
| 45 | 50 | 5 | −27 | 137 | 36 | 2.3 | 19.1 | 8.4 | 3.35 | 56.9 | 93 | 38.8 |
| 40 | 50 | 10 | −26 | 140 | 35 | 2.2 | 18.6 | 8.5 | 3.73 | 56.4 | 93 | 38.9 |

The invention claimed is:

1. A method of modifying a heat transfer system containing R-410A comprising removing R-410A and adding refrigerant comprising a ternary composition consisting essentially of from 5 to 83 wt % of 2,3,3,3-tetrafluoropropene, from 15 to 75 wt. % of difluoromethane, and from 2 to 40 wt. % of 1,1-difluoroethane.

2. The method as claimed in claim 1, wherein the ternary composition consists essentially of from 5 to 63 wt. % of 2,3,3,3-tetrafluoropropene and from 35 to 70 wt. % of difluoromethane and from 2 to 25 wt. % of 1,1-difluoroethane.

3. The method as claimed in claim 1, wherein the refrigerant further comprises a stabilizer.

4. The method as claimed in claim 3, wherein the stabilizer is selected from the group consisting of nitromethane, ascorbic acid, terephthalic acid, azoles, phenolic compounds, epoxides, phosphites, phosphates, phosphonates, thiols and lactones.

5. The method as claimed in claim 3, wherein stabilizer represents at most 5% by weight relative to the refrigerant.

6. The method as claimed in claim 1, wherein the heat transfer system is of the compression type.

7. The method as claimed in claim 6, wherein the heat transfer system operate with exchangers in countercurrent mode or in crossed-current mode with countercurrent tendency.

8. The method as claimed in claim 6, wherein the refrigerant consists of from 5 to 83 wt. % of 2,3,3,3-tetrafluoropropene, from 15 to 75 wt. % of difluoromethane and from 2 to 40 wt. % of 1,1-difluoroethane, and optionally, a stabilizer and/or lubricant.

9. The method as claimed in claim 6, wherein the refrigerant consists of from 5 to 63 wt. % of 2,3,3,3-tetrafluoropropene and from 35 to 70 wt. % of difluoromethane and from 2 to 25 wt. % of 1,1-difluoroethane, and optionally, a stabilizer and/or lubricant.

10. The method as claimed in claim 6, wherein the refrigerant consists of from 40 to 58 wt. % of 2,3,3,3-tetrafluoropropene and from 40 to 50 wt. % of difluoromethane and from 2 to 10 wt. % of 1,1-difluoroethane, and optionally, a stabilizer and/or lubricant.

11. The method as claimed in claim 1, wherein the heat transfer system is of the compression type operating with exchangers in countercurrent mode or in crossed-current mode with countercurrent tendency.

12. The method as claimed in claim 1, wherein the ternary composition consists essentially of from 40 to 58 wt. % of 2,3,3,3-tetrafluoropropene and from 40 to 50 wt. % of difluoromethane and from 2 to 10 wt. % of 1,1-difluoroethane.

13. The method as claimed in claim 1, wherein the refrigerant further comprises a lubricant.

14. The method as claimed in claim 13, wherein the lubricant is selected from the group consisting of mineral oil, alkylbenzene, polyalkylene glycol and polyvinyl ether.

* * * * *